United States Patent
Steffens

(10) Patent No.: US 8,249,361 B1
(45) Date of Patent: Aug. 21, 2012

(54) INTERDEPENDENT LEARNING OF TEMPLATE MAP AND SIMILARITY METRIC FOR OBJECT IDENTIFICATION

(75) Inventor: Johannes B. Steffens, Westoverledingen (DE)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 12/765,728

(22) Filed: Apr. 22, 2010

(51) Int. Cl.
*G06K 9/62* (2006.01)
*G06K 9/00* (2006.01)

(52) U.S. Cl. .................. 382/209; 382/118; 382/159

(58) Field of Classification Search .................. 382/103, 382/118, 159, 209, 218
See application file for complete search history.

(56) References Cited

U.S. PATENT DOCUMENTS

| | | | |
|---|---|---|---|
| 6,301,370 B1 | 10/2001 | Steffens et al. | |
| 7,020,337 B2 | 3/2006 | Viola et al. | |
| 7,031,499 B2 | 4/2006 | Viola et al. | |
| 7,302,084 B2 * | 11/2007 | Szeliski et al. | ............. 382/103 |
| 7,840,060 B2 * | 11/2010 | Podilchuk | ................. 382/155 |

OTHER PUBLICATIONS

Collins, M., et al., "Logistic Regression AdaBoost and Bregman Distances," School of Computer Science & Engineering, Hebrew University, Oct. 11, 2000, 26 Pages.
Friedman, J., et al., "Additive Logistic Regression: a Statistical View of Boosting," Aug. 20, 1998, 36 Pages.
Freund, Y., et al., "Experiments with a New Boosting Algorithm," AT&T Research, Jan. 22, 1996, 15 Pages.
Jones, M., et al., Face Recognition Using Boosted Local Features, Mitsubishi Electronic Research Laboratories, Apr. 2003, 10 Pages.
Schapire, ., et al., "The Boosting Approach to Machine Learning—An Overview," AT&T Labs-Research Shannon Laboratory, Dec. 19, 2001, 23 Pages.
Viola, P., et al., "Robust Real-time Object Detection," Second International Workshop on Statistical and Computational Theories of Vision—Modeling, Learning, Computing, and Sampling, Jul. 13, 2001, 25 pages.
Yang, P., et al., "Face Recognition Using Ada-Boosted Gabor Features," Proceeding of the 6th IEEE International Conference on Automatic Face and Gesture Recognition, May 2004, pp. 356-361.
Li, S., et al., "Illumination Invariant Face Recognition Using Near-Infrared Images," IEEE Transactions on Pattern Analysis and Machine Intelligence, Apr. 2007, pp. 627-639, vol. 29, No. 4.

* cited by examiner

*Primary Examiner* — Daniel Mariam
(74) *Attorney, Agent, or Firm* — Fenwick & West LLP

(57) ABSTRACT

An object identification system iteratively learns both a template map used to transform a template describing an object in an image, and a related similarity metric used in comparing one transformed object template to another. This automatic learning eliminates the need to manually devise a transformation and metric that are effective for a given image corpus. The template map and the similarity metric are learned together, such that the incremental component to be added to the template map at a given iteration of the learning process is based at least in part on the components of the similarity metric, and vice-versa.

21 Claims, 7 Drawing Sheets

INTERDEPENDENT LEARNING OF TEMPLATE MAP AND SIMILARITY METRIC FOR OBJECT IDENTIFICATION

BACKGROUND

1. Field of Art

The present invention generally relates to the field of digital image analysis, and more specifically, to methods of learning image transformations and similarity metrics used to perform identification of objects in digital images.

2. Background of the Invention

Object recognition systems determine whether a given image contains an object of a particular category, such as a human face, a license plate, or other known object. Object identification systems determine whether an object that has been recognized matches a previously recognized object—such as a particular human face, or a particular type of cancerous tumor—based on some measure of similarity between the images.

One type of object identification system directly determines the degree of similarity between objects by directly comparing their respective pixels. However, such pixel comparison is time-consuming, and thus is of limited utility when performing operations such as determining which of a large set of objects is most like a given object, where the number of comparisons grows quadratically with the number of objects in the set and thus many comparisons may need to be performed. Thus, a second type of object identification system (hereinafter, a "transformation-based object identification system") instead identifies an object within a digital image using an image transformation and a similarity function. The image transformation takes as input the raw image pixels of the object and produces as output a standardized representation of the object (e.g., a vector of real numbers). The similarity function takes as input the standardized representations of a pair of objects and produces as output an indicator, e.g., a floating point number, quantifying the degree of similarity of the objects. The representations produced by the image transformation can be stored considerably more compactly than the original pixel representation of the object, and the similarity metric operating on these compact representations can in turn be computed more quickly than can direct pixel comparisons.

However, even with a transformation-based object identification system, the problem remains of formulating the image transformation and the similarity metric. Existing object identification systems require the image transformation, or the similarity metric, or both, to be manually specified by a system designer prior to image analysis. For example, some existing systems employ fixed filters, such as Gabor filters, as the image transformation, and use a dot product of the resulting vector representations as the similarity metric. However, such an approach requires a system designer to devise image transformations and similarity metrics that produce accurate identification results for a given image corpus. Given the large potential variations between different types of image corpuses containing objects to be identified, a particular image transformation and similarity metric that are effective for one corpus may not be effective for a different corpus. As a result, the system designer must make repeated attempts to determine the appropriate transformation and metric for a given corpus of images.

For example, one corpus may contain very standardized pictures of faces in a given pose and lighting condition (e.g., standard photos of employees, such as for identification badges), a second corpus may contain informal pictures of people in very different poses and lighting conditions (e.g., pictures from a family photo album), and a third may contain images of patients' bodies produced by medical devices. The first and second corpuses might both be used for identification of faces, but given the different conditions (such as lighting, pose, distance, etc.) a single image transformation and similarity metric would be unlikely to be equally effective for both. The third corpus might be used by a hospital radiology department for identification of cancerous tumors, and the image transformation and similarity metric used in the facial identification systems would be ineffective for such radiology images. However, manual experimentation to determine an image transformation and similarity metric effective for every existing corpus would be an unduly burdensome task.

SUMMARY

An object identification system iteratively and automatically learns both a template map used to transform a template describing an object in an image, and a related similarity metric used in comparing one transformed object template to another. The template map comprises a set of data, such as matrix data, that when applied to the object template (e.g., a vector), produces the transformation that transforms the template to a form that is more compact and serves to better discriminate among different objects. Similarly, the similarity metric comprises data, such as matrix data, that is applied to the transformed object templates to produce a measure of similarity. The automatic learning eliminates the need to manually devise a transformation and metric that are effective for a given image corpus. The template map and the similarity metric are learned together, such that the components to be added to the template map during the learning process are based at least in part on the components of the similarity metric, and vice-versa.

The learning process proceeds iteratively, with components being added to the template map and the similarity metric at each iteration. In one embodiment, a set of candidate map components is selected at each iteration for potential inclusion in the template map, and a similarity metric component best minimizing a loss function is derived for each candidate map component. These candidate map and metric components are evaluated with respect to the loss function to determine an associated measure of accuracy, with the pair resulting in the best accuracy (e.g., least loss) being selected for addition to the template map and similarity metric.

In one embodiment, the template map and similarity metric are designed to have a number of properties useful for purposes of iterative learning, such as being composed of incremental portions (i.e., the components added at each iteration) such that a loss function for the incremental portion can be expressed with a closed form solution.

Once the template map and similarity metric are learned, they can be applied to identify objects, such as faces. For example, the learned template map can be applied to transform raw template vectors representing images of faces into corresponding reduced templates of reduced size and increased ability to usefully describe a face. The similarity metric can then compare a pair of the reduced templates, producing a score quantifying a degree of similarity between their corresponding faces.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Overview

Figure 1A:
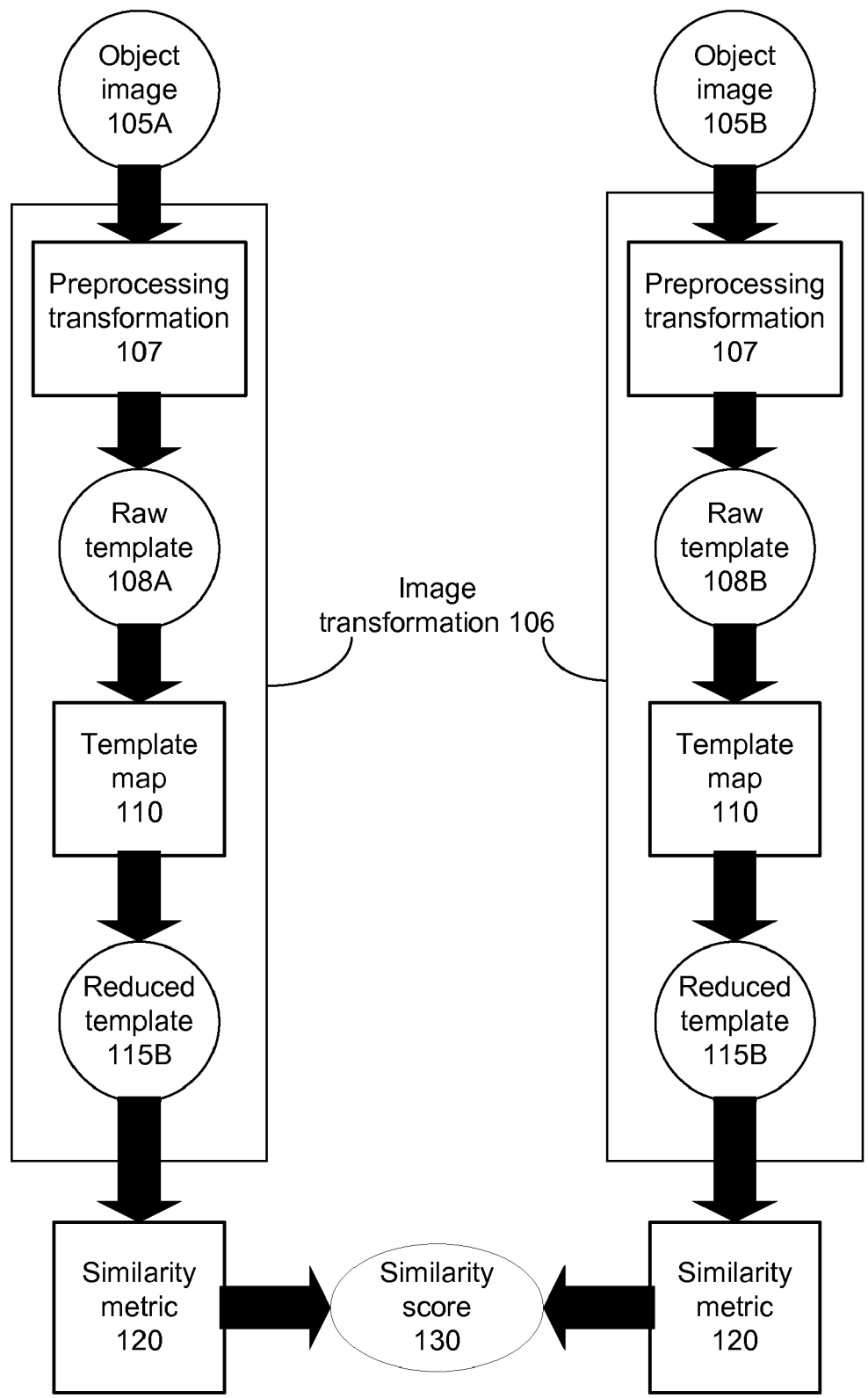
FIG. 1A is a data flow diagram illustrating the use of an image transformation and a similarity metric within a transformation-based object identification system.

FIG. 1A is a data flow diagram illustrating the use of an image transformation 106 and a similarity metric 120 within a transformation-based object identification system, in which two images are compared to determine a degree of visual similarity between them. More specifically, object images 105A and 105B represent an image containing a particular type of object, such as a human face. Each object image 105 is provided as input to the image transformation 106, which performs one or more operations to produce a reduced, reduced representation of the object. The reduced representation is "reduced" in the sense that the amount of data used to store the reduced representation requires less data than needed to store the image itself, e.g., 1 kilobyte or less, rather than 10 kilobytes. Note that although the remainder of this document refers to one specific example of object identification—face identification—in which the objects to be identified are human faces, it is appreciated that the present invention is applicable to identification of any type of object, such as a tumor, a building, or a hand, and not merely to identification of human faces.

In the example of FIG. 1A, the image transformation 106 comprises a preprocessing transformation 107 and a template map 110. The preprocessing transformation 107 performs initial operations to map the image pixel data to an initial feature-based representation of the face. For example, the preprocessing transformation 107 could first detect the boundary of a face within an image 105. The preprocessing transformation 107 could then detect facial features within the boundary of the face, such as points at the pupil of the eye, the inside corner of the eye, the corners of the mouth, the tip of the nose, and the like, and extract a quantitative (numerical) description of those facial features using techniques such as Gabor wavelets, eigenfaces and eigenfeatures, Fisher faces and features, and the like. The result is a raw template 108, such as a concatenated set, or vector, of facial feature descriptions, where each facial feature description comprises a set of real numbers describing visual characteristics of the facial feature such as color intensity, luminosity, texture, edges, wavelet or other transforms, etc., where these feature values are distinct from the underlying pixel values in the image. The template map 110 then transforms the raw template 108 into a reduced template 115 that optimizes its use for discrimination among faces by a similarity metric 120, including reducing the amount of data used the represent the template. The similarity metric 120 accepts as input the reduced templates 115A and 115B for the two faces and outputs a similarity score 130 that quantifies the similarity of the faces.

The template map 110 and the similarity metric 120 may be represented by many different kinds and numbers of data structures in different embodiments. In one embodiment, the template map 110 employs a linear map matrix and a quantizer function that together reduce an n-dimensional raw template 108 containing real numbers to an m-dimensional vector of integers (for some m<n), and the similarity metric 120 comprises a set of m matrices, values of which are selected and summed as a function of the reduced face templates to determine the similarity value of the faces. The linear map, quantizer, and set of matrices are referred to throughout the remainder of the specification as the data structures (or "object identification data structures") employed in one example embodiment, though other data structures could likewise be employed.

Figure 1B:
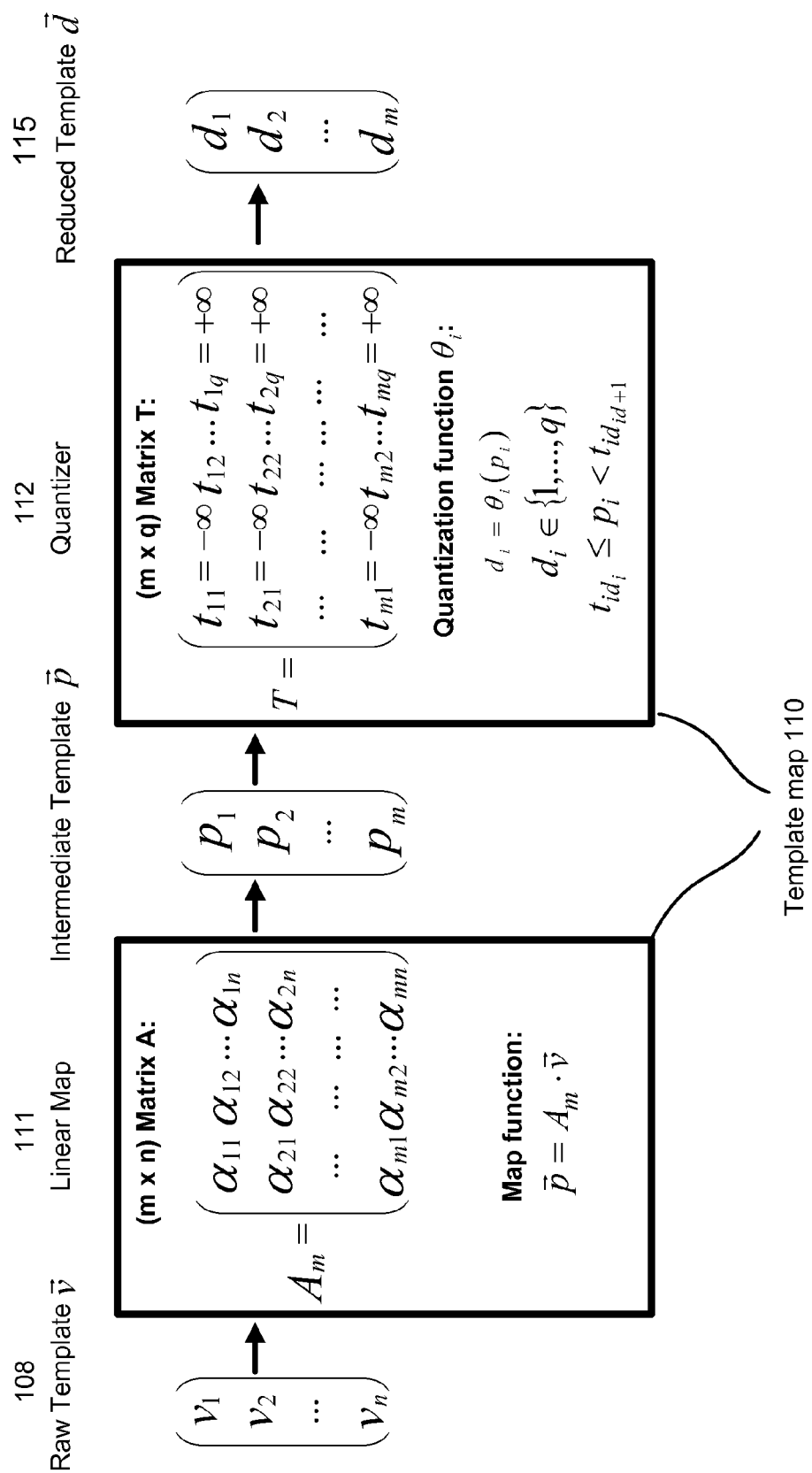
FIG. 1B depicts the operations of a linear map and a quantizer function that make up a template map of FIG. 1A, according to one embodiment.

The template map 110 and the similarity metric 120 may be implemented in various manners in different embodiments. As noted, in one embodiment the template map 110 comprises a linear map matrix and a quantizer function. FIG. 1B depicts an example of the operations of the linear map 111 and quantizer function 112, according to one embodiment. In FIG. 1B, a raw template, v, is a vector of n elements (e.g., real numbers), $v_1$ through $v_n$, which together describe certain visual features or characteristics of the image of an object. The linear map 111 is an (m×n) matrix, also referred to hereinafter as A, that maps the n-dimensional raw template vector v to an m-dimensional intermediate template, p, via matrix multiplication.

The quantizer function 112, also referred to hereinafter as T, maps (quantizes) each real-number-valued element of p to an integer equivalent in the resulting reduced template, thereby reducing the amount of memory required to represent p. The quantizer function T comprises m sets of ranges, each set $\theta_i$ having q ranges. The union of the q ranges for each set $\theta_i$ covers all real numbers from −∞ to +∞. For example, the first range $g_0$ for one set $\theta_j$ could represent the interval from −∞ to −10,000 (inclusive); the next range $g_1$ the interval from −10,000 (exclusive) to −3,922 (inclusive); the next range $g_2$ the interval from −3,922 (exclusive) to −2,218 (inclusive); and so forth, to the last range $g_q$ extending from some integer m to +∞. Each set of ranges maps a real number to an integer representing the index of the range containing the real number. Using the above example, the real number −12,000 would be mapped to the index value of "0" corresponding to the first range (assuming 0-based indexing), the real number −8,000 to the index value of "1" corresponding to the second range and so forth. Thus, the quantizer function 112 may be understood to convert each real number element $p_m$ to an integer index value i representing the index corresponding to range r which contains $p_m$ within a corresponding set of ranges $\theta_i$.

The dimension n of A is designed to match the number of items n (e.g., 10,000) in the raw template vectors produced by the preprocessing transformation 107. In one embodiment, the dimension m of A and T is the number of iterations (e.g., 2000) performed by a learning process that learns the template map 110 and the similarity metric 120—with one row being added to the matrix A and one set of ranges to T at each iteration. This learning process is described further below with respect to FIG. 4.

Figure 1C:
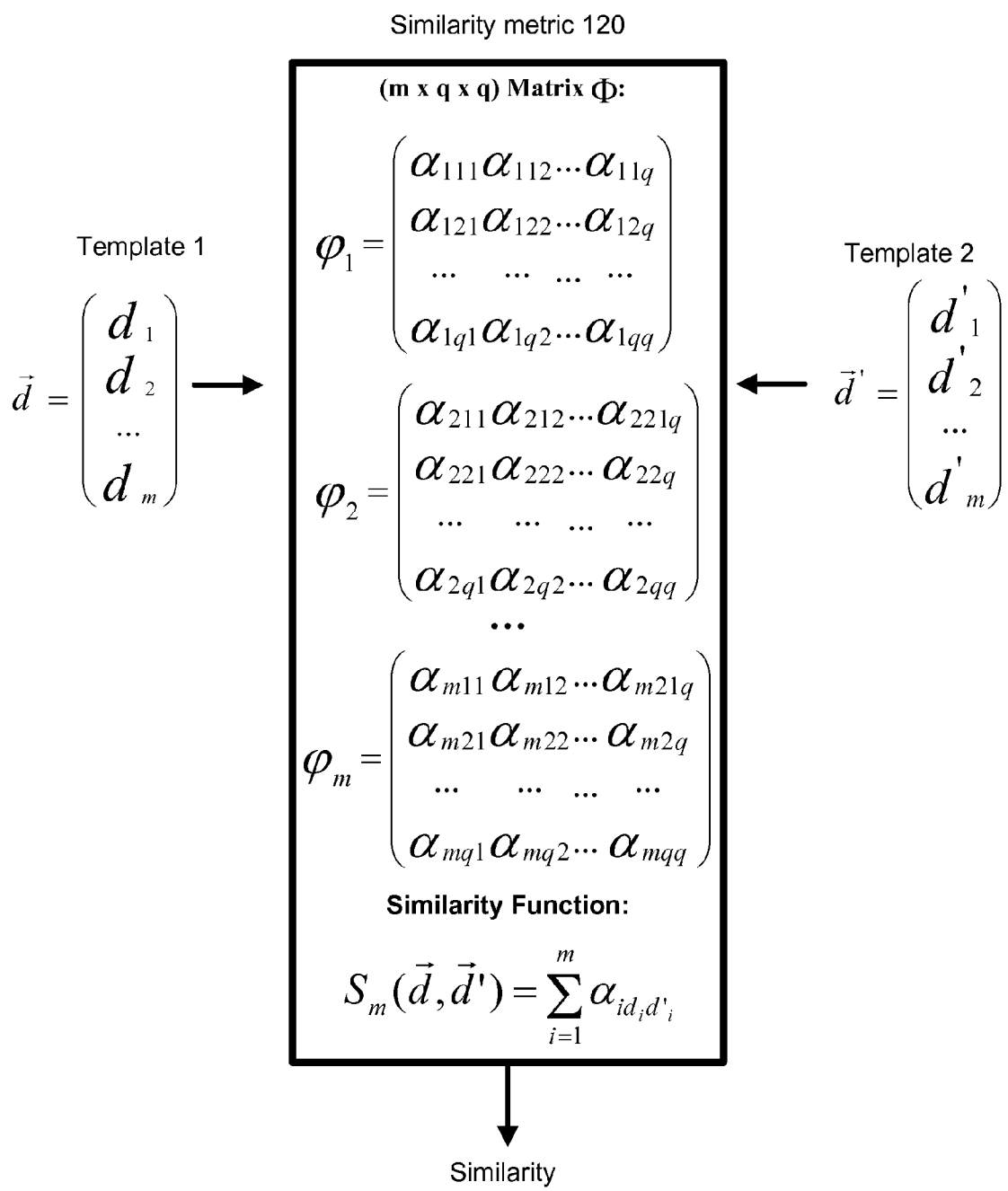
FIG. 1C depicts a set of matrices used in the computation of the similarity metric of FIG. 1A, according to one embodiment.

FIG. 1C depicts a set of m matrices used in the computation of the similarity metric 120 of FIG. 1A, according to one embodiment. The m matrices are also referred to hereinafter as $\Phi$, each matrix of dimension (q×q), q being the same as the number of ranges within one of the sets $\theta_i$ of the quantizer function T. The similarity metric 120 of two reduced templates 115, d and d', is computed by summing, for each matrix $\phi_i$ in $\Phi$, the element at row $d_i$ and column $d'_i$, where $d_i$ and $d'_i$ are the $i^{th}$ elements in d and d', respectively. The dimension q can be set by a system designer to any convenient value, such as a power of 2 (e.g., 16). That is, similarity metric S is defined as:

$$S_m(\vec{d}, \vec{d}^{\,t}) = \sum_{i=1}^{m} \alpha_{id_i d'_i}$$

where $\alpha_{id[i]d'[i]}$ represents the $d_i^{th}$ row and $d'^{th}_i$ column of matrix $\phi_i$. Note that even though $\Phi$ has m matrices, each of dimension (q×q), the computation of the similarity metric S 120 requires only m data lookups, one for each of the m matrices, and m−1 additions. In one embodiment, the matrices $\phi_i$ in $\Phi$ are symmetric and thus only q*(q+1)/2 elements need be stored per matrix. Furthermore, in one embodiment all parameters can be expressed as a function of fewer parameters; thus, only these fewer parameters need be stored.

In the above, the matrix A serves as a linear transformation of a raw template 108—which tends to contain redundant information or be otherwise mis-aligned—into an optimized vector space. The quantizer T provides any non-linearity that can further optimize the results of the similarity metric S 120, and additionally increases the speed of the computation of S by mapping real numbered values of the intermediate template of FIG. 1B to integer values that can be used to look up the entries of the matrices $\phi_i$ in $\Phi$. It is appreciated that the use of A, T, and $\Phi$ as the object identification data structures that implement the template map 110 and the similarity metric 120 is a design choice, and that other data structures could equally be used.

Returning again to FIG. 1A, even assuming a fixed, generally-applicable preprocessing transformation 107, the data flow of FIG. 1A still depends on knowledge of the values for the template map 110 and the similarity metric 120. The present invention provides a means for determining these values automatically by analysis of the images in a corpus, thus eliminating the need for substantial trial and error attempts by the system designer to select the appropriate values.

System Architecture

Figure 2:
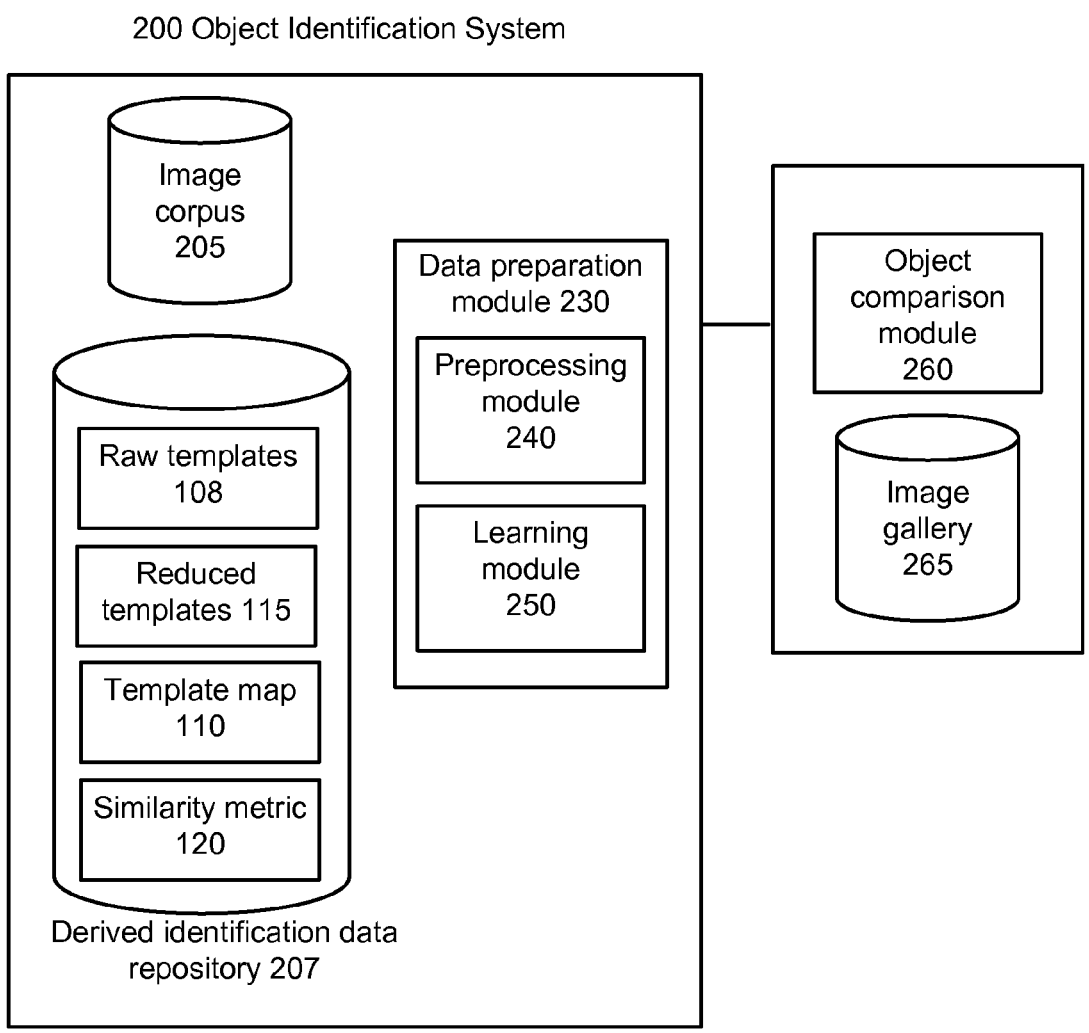
FIG. 2 illustrates an object identification system for learning a template map and a similarity metric, as well as for performing object identification based on the learned map and metric, according to one embodiment.

FIG. 2 illustrates an object identification system 200 for learning a template map 110 and a similarity metric 120 that work well together for a given corpus of images, according to one embodiment. Once the system 200 has learned the map 110 and the metric 120, it (or another system) can use them to perform object identification based on the learned map and metric, e.g., using the process depicted in FIG. 1A. The object identification system 200 of FIG. 2 comprises an image corpus 205, a derived identification data repository 207, a data preparation module 230, and, in some embodiments, an object comparison module 260 and an image gallery 265. In this description, the term "module" refers to executable logic for providing the specified functionality. A module is implemented in hardware, firmware, and/or software, the choice of which is an implementation decision depending on the system requirements. Where the modules described herein are implemented as software, a module can be implemented as a standalone program, but can also be implemented through other means, for example as part of a larger program, as a plurality of separate programs, or as one or more statically or dynamically linked libraries; in each of these embodiments, the modules are persistently stored on a computer readable storage device (e.g., hard disk), loaded into the memory, and executed by one or more processors included as part of the system to provide the specified functionality. It will be understood that the named modules described herein represent one embodiment of the present invention, and other embodiments may include other modules. In addition, other embodiments may lack certain ones of modules described herein and/or distribute the described functionality among the modules in a different manner. Additionally, the functionalities attributed to more than one module can be incorporated into a single module. Further, hardware or software modules may be stored elsewhere within the object identification system 200. The object identification system 200 includes hardware elements necessary for the operations described here, including one or more processors, high speed memory, hard disk storage and backup, network interfaces and protocols, input devices for data entry, and output devices for display, printing, or other presentations of data. The operations of the object identification system 200 and its modules will be further described below with respect to FIG. 2 and the remaining figures.

The training set 205 comprises a set of r images containing faces (or other objects in the domain of interest) of a set of people (e.g., hundreds of people). Based on the training set 205, general discriminating facial characteristics that are learned and can be later applied by the object comparison module 260 to recognize faces. Each image represents a distinct person and has as associated metadata a unique identifier of the person, such as an ID number assigned by a human manually labeling the people within each of the r images. A person may be represented with multiple images in the training set 205, each image of the person with its own pose, lighting, facial expression, distance, and the like, but all sharing the same identifier. The number of images associated with each person can vary (e.g., 15 images for one person, 8 for a second person, and so on) with variation in terms of content or format. Thus different images can provide different content, such as a variety of facial expressions (e.g. smile, frown), lighting conditions, cropping, color tone, and the like. The images of the training set 205 could be drawn from any source of digital images, such as online photo albums, or images of people retrieved (e.g., crawled) from the Internet, as well as or in addition to a set of uniform images produced specifically for use in facial identification. In one embodiment, to simplify subsequent processing the training set 205 additionally stores an associated matrix of values that specifies whether any given pair of images represents the same person. This matrix is hereinafter referred to for simplicity as $same_{ij}$, representing whether the $i^{th}$ and $j^{th}$ images of the set of r images represent the same person. The values of $same_{ij}$ can be derived by comparing the unique identifiers of the $i^{th}$ and $j^{th}$ images, setting same$_{ij}$ to a value indicating sameness (e.g., to 1) if the identifiers are the same, and to a value indicating difference (e.g., to −1) otherwise.

The image gallery 265, like the training set 205, stores images of faces (or other objects to be recognized). The image gallery 265 represents the set of people that can be recognized by the object comparison module 260, and in one embodiment has a single representative image of each person to be recognized.

The training set 205 serves as input for the data preparation module 230, which processes the images in the corpus and stores the resulting data (i.e., the raw templates 108, the values for the template map 110 and the similarity metric 120, and the reduced templates 115) in the derived identification data repository 207. Thus, the derived identification data repository 207 stores the raw templates 108 and the reduced templates 115, as well as the template map 110 and the similarity metric 120 depicted in FIG. 1A. More specifically, a preprocessing module 240 of the data preparation module 230 preprocesses the images in the training set 205 as described above with respect to the preprocessing transformation 107 of FIG. 1A, outputting the raw image templates 108. A learning module 250 of the data preparation module 230 takes as input the raw image templates 108 output by the preprocessing module 240 and learns the template map 110 and the similarity metric 120, storing them in the derived identification data repository 207. The data preparation module 230 can further apply the learned template maps 110 to the images in the image gallery 265, obtaining a reduced template 115 for each image and storing the reduced templates in association with (or instead of) the images from which they were derived. In one embodiment, due to the memory savings arising from reduction in template dimensionality and the conversion from real numbers to integers, each reduced template 115 can be stored within one kilobyte of memory or less.

The object comparison module 260 uses the template map 110 and the similarity metric 120 stored in the derived identification data repository 207 to compute a similarity score 130, as described above with respect to FIG. 1A. For example, when comparing a new image of a face to a facial image already stored in the image gallery 265—e.g., to identify a new image as being of a person already known in the image gallery—the object comparison module 260 performs the preprocessing transformation 107 on the new image and applies the template map 110 to extract a new reduced template 115. The object comparison module 260 then compares the new reduced template to one or more existing reduced templates 115, corresponding to images from the image gallery 265, that are already stored in the derived identification data repository 207, and computes similarity scores 130. The comparison that results in the best similarity score 130 (e.g., highest value) indicates a match between the new image and the image associated with the matching template.

It is appreciated that the object identification system 100 depicted in FIG. 1A need not be a single physical computer system, such as a single server, but may comprise multiple distinct servers or other computer systems coupled together over a network. For example, in one embodiment the data preparation module 230 resides on a different physical system than the object comparison module 260, as depicted in FIG. 1A. In such an embodiment, both the data preparation module 230 and the object comparison module 260 may be replicated on multiple distinct systems, each having its own copy of the derived identification data repository 207.

Learning Process

Figure 3:
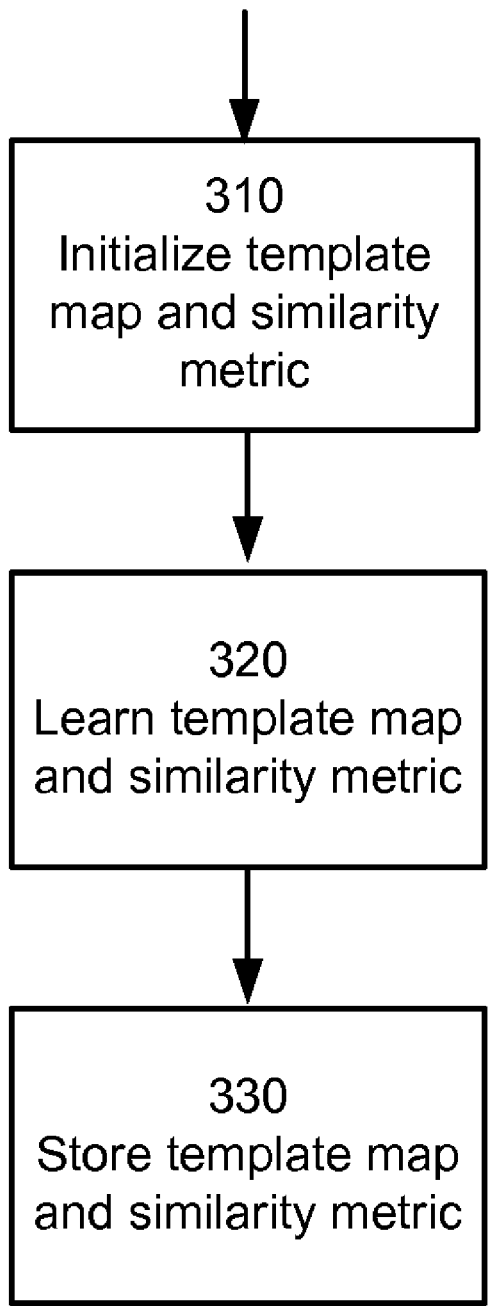
FIG. 3 is a flowchart illustrating a high-level view of the operations performed to create the template map and the similarity metric, according to one embodiment.

FIG. 3 is a flowchart illustrating a high-level view of the operations performed by the learning module 250 of FIG. 2 to create the template map 110 and similarity metric 120, according to one embodiment. First, the learning module 250 initializes 310 the template map 110 and similarity metric 120. In an embodiment in which the template map 110 and similar metric 120 are implemented as in FIGS. 1B and 1C, the initialization 310 comprises setting the object identification data structures for A, T, and Φ to empty, reflecting that no components have yet been determined. The term "components" as used herein denotes the various portions of data within the object identification data structures—such as the individual row vectors a of A, the distinct sets of ranges θ of T, and the q×q matrices φ of the set Φ—that are added to the data structures as they are learned.

With the appropriate initialization of step 310 accomplished, the learning module 250 learns 320 the template map 110 and similarity metric 120. In one embodiment, this involves performing a number of iterations, appending one entry to each of A, T, and Φ at each iteration, as described in more detail with respect to FIG. 4, below.

Finally, after the template map 110 and similarity metric 120 have been learned, the learning module 250 stores them—that is, stores the values representing their various elements—into the portions 110 and 120 of the derived identification data repository 207. The object comparison module 260 may then apply them when computing the similarity of a new image of an object to images of the object already present in the image gallery 265.

With the template map 110 and similarity metric 120 properly initialized in step 310 of FIG. 3, they are iteratively learned based on the images of the training set 205 (or, more specifically, on the raw templates 108 representing the images). At each iteration of the learning, the map 110 and metric 120, when used as part of a process such as that of FIG. 1A, act as a face identification system with some measurable degree of accuracy, and as more learned data is added to the map and metric at each iteration, that accuracy continually improves. This learning process is now described in more detail.

Figure 4:
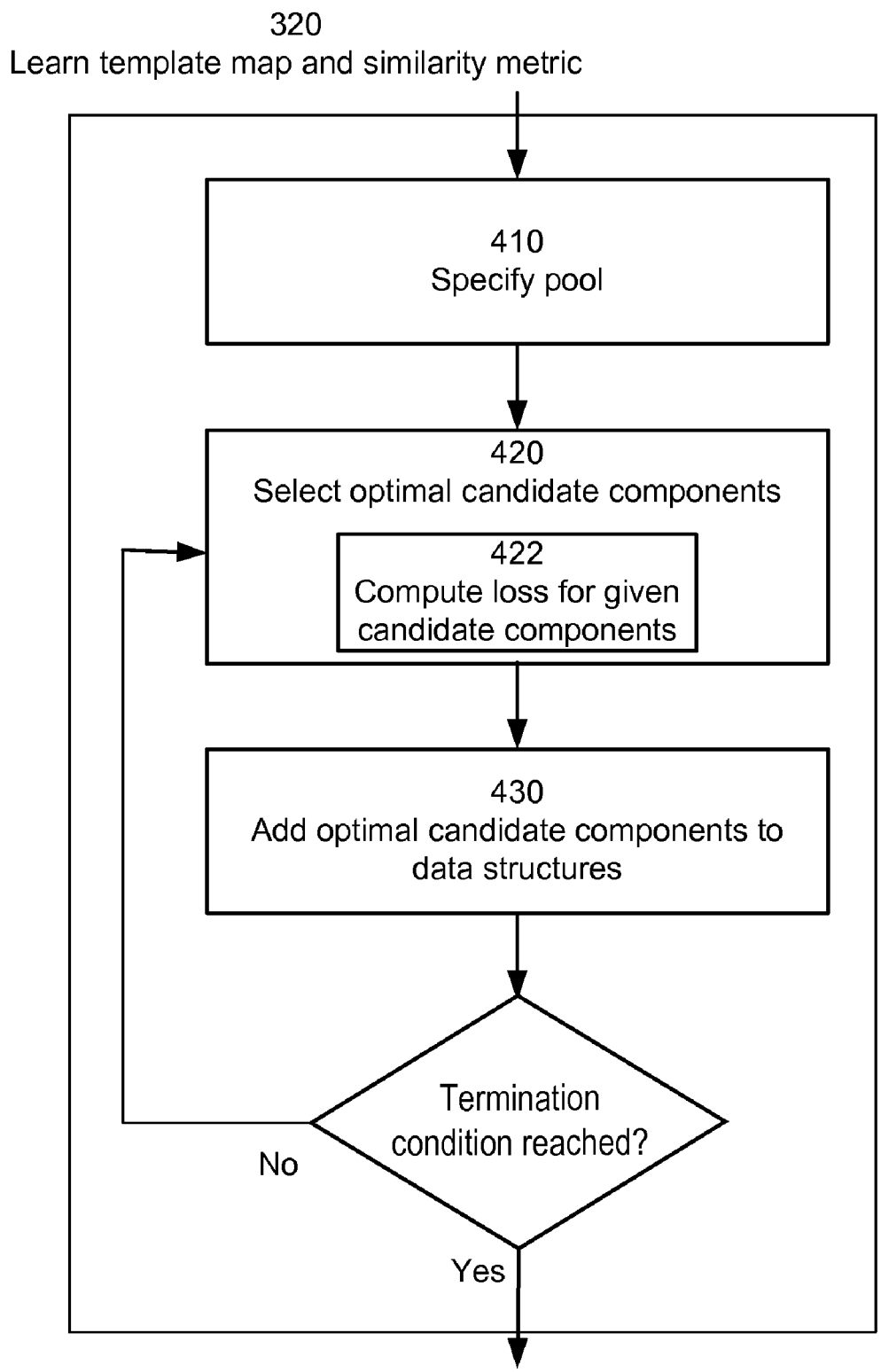
FIG. 4 is a flowchart illustrating in more detail the operations performed iteratively by the learning module 250 when learning the components of the template map 110 and the similarity metric 120 in step 320 of FIG. 3, according to one embodiment.

FIG. 4 is a flowchart illustrating in more detail the operations performed iteratively by the learning module 250 when learning the components of the template map 110 and similarity metric 120 in step 320 of FIG. 3, according to one embodiment. The learning module 250 operates in an iterative fashion, continually identifying components to add to the template map 110 and the similarity metric 120 (e.g., A, T, and Φ). At each iteration, components are selected to optimize object comparison accuracy, such as by minimizing the error resulting from application of the map 110 and metric 120 created by adding the selected components to the object identification data structures produced by the prior iteration. The learning of the template map 110 and the similarity function 120 is interdependent, in that minimization of the error involves selecting components for the map and metric that produce good results when used together, as described further below with respect to FIG. 5. Thus, the learning module 250 dynamically builds an interdependent map 110 and metric 120 that produce accurate results when used together within an object identification system, the accuracy tending to increase at each iteration.

More specifically, the learning module 250 initially specifies 410 a pool of candidates from which the components to add are selected at each iteration. The candidates need not be specified with utmost precision, since later stages of the iteration will select the optimal ones of the candidates. As one example, in the case of A, T, and Φ depicted in FIGS. 1B and 1C, the candidates are the n-dimensional row vectors a of the linear map A, the q-dimensional sets of ranges θ of the quantizer T, and the (q×q) matrices φ, where a pair from a and θ can be together viewed as a map component potentially to be added to the template map, and a matrix of φ as a metric component potentially to be added to the similarity metric. In one embodiment, θ is derived as a function of a, and φ is similarly derived from a by minimizing a loss function, as described further below, and thus only the row vectors a need be selected as candidates for the pool.

In one embodiment, the pool is static throughout the training, i.e., is the same at every iteration. Examples of static selection of candidates for a include selecting the components of the entire training set, selecting the basis of a vector-space describing the training set distribution (e.g., using principle component analysis (PCA) to identify the principle components of the training set), or selecting the row-vectors from a discrimination-improving matrix (e.g., using Fisher's multi-class linear discriminant analysis (LDA) or a similar technique). This pool of selected components is then used at every iteration.

In other embodiments, the pool is recomputed, either at every iteration or only during certain iterations (e.g., every fifth iteration, or in iterations in which some predetermined condition is met). One example of pool recomputation is choosing a random subset of the training set of raw object templates 108 at each iteration as the candidates for a.

With the set of candidates selected 410, optimal candidates are then selected 420 from that set. In one embodiment, the optimal candidates are determined by computing 422 the values of a given loss function that result when the various candidates are provisionally incorporated into the template map 110 and the similarity metric 120. Thus, in the case of A, T, and Φ described above, for each candidate $a_i$, the loss from using that $a_i$ (along with the $θ_i$ that is a function of $a_i$, and the φ that, when used with a, produces minimal loss) is computed, and the row vector $a_i$ resulting in the minimal loss is selected as the optimal candidate. The computation of the loss function is described in more detail below with respect to FIG. 5.

The optimal candidate components selected in step 420, such as $a_i$ (and the $θ_i$ and $φ_j$ derived from it) are then added 430 to the data structures embodying the template map 110 and similarity metric 120, such as A (and T) and Φ, e.g. by appending $a_i$ as a new row vector to A, $θ_i$ as a new set of ranges to T, and $φ_j$ as a new matrix to Φ. The augmented state of the map 110 and metric 120 is then used during the next iteration, where the additional information provided by the additional components results in greater identification accuracy than in the prior iteration.

At the end of an iteration, it is determined 440 whether a termination condition has been reached. If so, the iteration terminates, and the latest states of the object identification data structures representing the template map 110 and similarity metric 120 and are stored in the derived identification data repository 207 of FIG. 2, where they can later be read by the object comparison module 260 when determining the similarity of various objects. If not, then the next iteration is begun—at step 420 in embodiments in which the candidate pool is static, and at step 410 in embodiments in which it is dynamically specified at each iteration—and the map 110 and similarity metric 120 are further augmented by the new optimal candidates for that next iteration. A termination condition occurs when some predetermined number of iterations, such as 2,000, has been reached. Alternatively, termination can occur when the loss values cease to decrease—that is, when the loss value associated with the optimal candidate components of the current iteration is at least as great as the loss value associated with the optimal component of the prior iteration. Additionally, termination can occur based on some combinations of these conditions, e.g., when either a predetermined number of iterations has been reached or when the loss values stop decreasing.

Note that the use of A, T, and Φ satisfies a number of properties that are desirable for purposes of learning their components, such as compactness of the data structures, ability to decompose the data structures into a template map and a residual similarity metric that can be quickly computed, allowance for non-linearity in the object templates, ability to compose the data structures incrementally with a new portion added at each iteration, and ability to be evaluated by a loss function that can be expressed as closed form solution for the incremental portion. Further details regarding the mathematical background for these properties is provided in Appendix A, below.

The calculation of a loss value associated with use of a current state of the map 110 and metric 120—e.g., the state of the map and metric at the prior iteration, augmented with candidate components to be evaluated—is useful for determining how to build up the map and metric. That is, the loss value determines which candidate components are selected at a given iteration for inclusion into the map and metric, and can also determine whether the learning terminates (e.g., in response to the loss value of the optimally augmented map and metric at the end of the current iteration failing to be less than that of the prior iteration).

Figure 5:
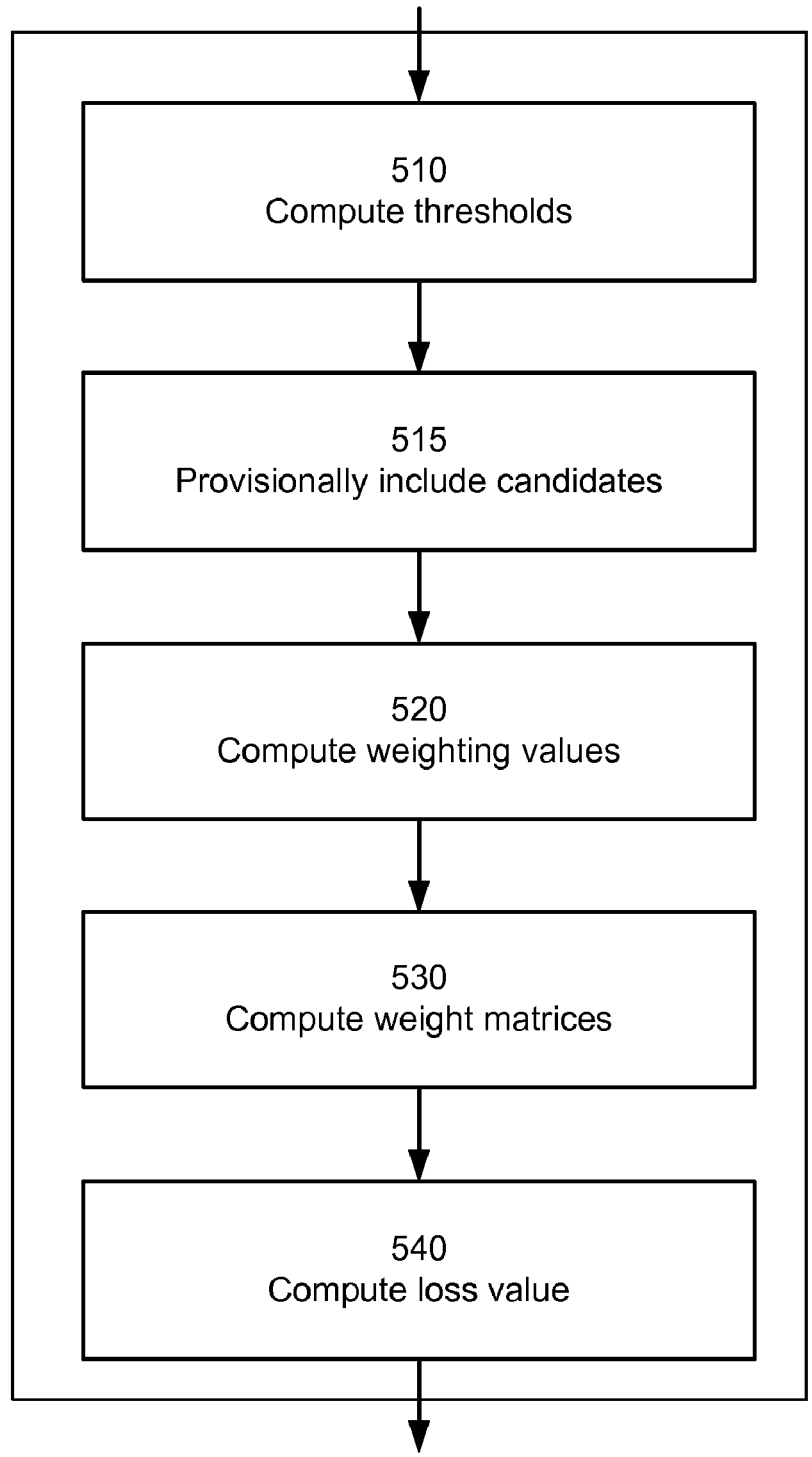
FIG. 5 is a flowchart illustrating in more detail the operations performed when computing a loss value for given candidate components, according to one embodiment.

FIG. 5 is a flowchart illustrating in more detail the operations performed when computing a loss value for given candidate components a in step 422 of FIG. 4, according to one embodiment.

Conceptually, to compute the loss value, L, identification errors are summed over all pairs of raw templates 108 in the set of r of raw templates. That is:

$$L = \sum_{i=1}^{r} \sum_{j=1}^{r} E(Sim(v_i, v_j), same_{i,j})$$

where $v_i$ and $v_j$ are raw templates 108 for objects with indexes i and j, $Sim(v_i, v_j)$ is a function that applies the template map 110 (e.g., the linear map 111 and quantizer 112) to each of the raw templates to produce reduced templates 115, and then compares the two reduced templates using the similarity metric 120. Further, as previously noted, $same_{ij}$ is +1 if the unique identifiers of objects with indexes i and j are the same (i.e., are known to represent the same object), and −1 if the identifiers are different (i.e., are known to represent different objects). The function E is some suitable error function, such as $1/(1+e^x)$. The below operations 510-540 are used to calculate a value of a loss function that is equivalent to L as defined above but less computationally intensive to compute.

Thresholds for a set of ranges θ are computed 510 as a function of the value of a. More specifically, the thresholds defining the ranges of θ are selected such that the set of $r_i = (a \cdot v_i)$—the dot product of a and each raw template $v_i$ 108 in the derived identification data repository 207—is approximately equally distributed across the ranges defined by the boundaries. The boundaries can be quickly computed by computing a histogram of θ and varying thresholds until all q histogram entries are approximately equal.

In order to compute the loss for given candidate component a (and θ and φ, which depend on a), the candidate components are provisionally incorporated 515 into the object identification data structures. That is, a (and θ and φ) are temporarily appended to A (and T and Φ), and then calculations are performed to assess the identification accuracy of the resulting data structures. The candidate components are later removed, and other candidate components substituted in their place, and are thus ultimately retained only if they are determined to be the optimal candidate components for the current iteration.

Weighting values are computed as a function of the current template map 110 and the current similarity metric 120, "current" referring to the provisional inclusion of the candidate components. For example, in one embodiment a weighting $\omega_{i,j}$ is computed for every pair of raw object templates 108 with indexes i and j according to the following equation:

$$\omega_{i,j}=1/1+e^{same[i,j]*Sim(vi,vj)}$$

Alternatively, $\omega_{i,j}$ could be defined as a function producing sufficiently approximate values, such as $$\omega_{i,j}=e^{-same[i,j]*Sim(vi,vj)}$$

Weight matrices are then computed 530 based on the computed weighting values, the weight matrices acting as the weights used in the boosted learning algorithm. In one embodiment, an element $W_{st}^+$ of matrix $W^+$ is defined as $\Sigma \omega_{i,j}$ for all indexes i, j such that $same_{i,j}$ is +1, $\theta(a \cdot v_i)$=s, and $\theta(a \cdot v_j)$=t, where s and t are indexes corresponding to any one of the r object templates. Similarly, an element $W_{st}^-$ of matrix $W^-$ is defined as $\Sigma \omega_{i,j}$ for all indexes i, j such that $same_{i,j}$ is −1, $\theta(a \cdot v_i)$=s, and $\theta(a \cdot v_j)$=t. In another embodiment, in order to reduce processing time, $W^+$ and $W^-$ are computed only across a random subset of index pairs <i, j>, rather than across all pairs <i, j>.

The loss value is then computed 540. In one embodiment, a loss value $L_2$ is a function of the computed weights, i.e.:

$$L_2 = \left(\sum_{i=1}^{q}\sum_{j=1}^{q} W_{ij}^- e^{\alpha[i,j]}\right)\left(\sum_{i=1}^{q}\sum_{j=1}^{q} W_{ij}^+ e^{-\alpha[i,j]}\right)$$

In another embodiment, the loss value is computed with some variation of $L_2$ produced by a strictly monotonic function. That is, the loss value is $f(L_2)$ for some strictly monotonic function $f$. In any case, the loss function can be expressed in closed form.

The computed loss value is then compared to loss values produced by other candidate components a (and $\theta$ and $\phi$) in order to select optimal candidate components, as described above with respect to step 420 of FIG. 4. That is, the candidate component a having the lowest associated loss value is selected and appended (along with the range set $\theta$ and matrix $\phi$ that depend on a) to A (and T and $\Phi$), and the learning process of FIG. 4 can continue to the next iteration (or terminate, if applicable). Note that since a and $\phi$ are evaluated together in order to produce a minimal loss value, this effectively learns the A and $\Phi$ that they make up (and in turn, the template map 110 and the similarity function 120 that they respectively represent) in an interdependent manner. That is, the map 110 and metric 120 are not learned in isolation of each other, such as the map being learned first, and the metric being learned afterward, or even both being learned in parallel but independent of the other; rather, at each iteration the values added to the map 110 help to determine the values added to the metric 120, and vice-versa.

With the learning of the template map 110 and the similarity metric 120 complete, they are persistently stored in the derived identification data repository 207. Then, as previously described, the comparison module 260 can use the learned map 110 and metric 120 to compare an object with an object already in the image gallery 265. A detailed mathematical derivation of the foregoing operations is set forth in Appendix A. For example, the basis of the identification of the components minimizing of the loss function is explained in more detail in equations (12)-(16) and the accompanying text.

In sum, the present invention learns both the template map 110 and the similarity metric 120 based on the given training set 205. Then, the comparison module 260 can apply map 110 and metric 120 in a process similar to that depicted in FIG. 1 to obtain a similarity score 130 that quantifies a degree of similarity between two object images 105. As a result of their interdependence during the learning process 320, the map 110 and metric 120 work effectively together when performing object identification.

Mathematical Derivation

The following discussion provides additional mathematical details regarding the derivation of the various structures and formulae used in the learning process.

Generic Metric Model

The learning algorithm very efficiently selects and fuses features with different properties (e.g. Gabor magnitudes and phase). It also provides a way to create highly compressed templates.

"Raw feature space" denotes a vector space carrying composite raw data (pixel values, gabor magnitudes, gabor phases). Our goal is learning a processor (=feature map) to convert a raw vector into a template and learning a metric that compares templates for the purpose of discriminating between persons.

Let $V=\Re^n$ be a raw feature space. We define a Metric $S(u,v):V \times V \to \Re$; $u \in V$, $v \in V$. We decompose S as follows:

$$S(u,v)=\Phi(A \cdot u, A \cdot v), \text{ with } A: \Re^n \to \Re^m \text{ being a linear map} \quad (1)$$

We represent $\Phi$ as sum of scalar operators on component-pairs:

$$\Phi(u',v') = \sum_{i=1}^{m} f_i(u_i', v_i') \quad (2)$$

The function $f: \Re^2 \to \Re$ is typically non-linear.

We want to obtain operators A, $f$ such that S optimally discriminates feature-pairs of the same class from those of different classes (in Face Recognition a "class" is a person). Here the operator A represents the feature map while $f$ represents the metric.

This approach has the following properties: (1) Linear approach is a special case: $f(x,y)=xy$. (2) Fast & compact when representing $f$ by lookup table. (3) Efficient template representation through quantization. (4) S can be incrementally learned. (5) Decomposition to vector map+dot product is a special case.

Boosted Metric Learning

This approach brings metric learning into the form of boosted two-class learning. This could be done by interpreting a metric as a classifier of vector-pairs. Hence vector pairs are training samples for the boosted learning. Sample labels 'y' denote whether the pair represent the same class (=same person) or not.

We describe S in incremental steps using (1) and (2):

$$S_k(u, v) = \sum_{l=1}^{k} f_l((a_l \cdot u), (a_l \cdot v)) = S_{k-1}(u, v) + f_k((a_k \cdot u), (a_k \cdot v)) \quad (3)$$

where $a_i$ are row-vectors of matrix A, referred to as 'projectors'.

Given a training set $T=\{(v_1,c_1),(v_2,c_2),\ldots,(v_r,c_r)\} \in V \times \aleph \times r$ we define the loss function as sum over a local error E on pair-combinations:

$$L = \sum_{i=1}^{r} \sum_{j=1}^{r} E(S(v_i, v_j), y_{ij}) \quad (4)$$

with $$y_{ij} \in \{+1,-1\}; \text{ particularly: } y_{ij}=1 \text{ if } c_i=c_j; y_{ij}=-1 \text{ if } c_i \neq c_j \quad (5)$$

$E(x,y)$ is a suitable loss function: e.g. $e^{-yx}$ (exp loss), $\ln(1+e^{-yx})$ (log loss), . . . .

The approach employs a weak learner that provides $f_k$ for a given projector $a_k$. For each k the boosting algorithm scans a pool of projectors for the best fitting $a_k$ at given training set. Below we describe how the weak learner is constructed and what the projector pool looks like.

Weak Learner

To learn $f$, we parameterize it by a table of coefficients $\alpha$ with scalar offset $\delta$ as follows:

$$f(x, y) = \delta + \sum_{i=1}^{q} \sum_{j=1}^{q} \alpha_{ij} h_i(x) h_j(y) \quad (6)$$

with quantization functions h $$h_l \in \{0,1\}; \quad (7)$$

Quantization Functions h

Each quantization function responds '1' in a dedicated interval and '0' outside. Adjacent quantization functions have adjacent but disjoined intervals.

$$h_i(x)h_j(x)=0 \text{ if } i \neq j \text{ for all } x \in \mathcal{R} \quad (8)$$

Intervals are chosen to cover the value range and cause equal distributed responses of all functions on the training data.

Determining the Weak Learner Analytically

The weak learner's purpose is to specify $f_k$ for a given projector $a_k$. The approach does so analytically through minimizing the exponential loss function. We show at the end that the result can be translated into a solution for log-loss.

With (3), (4) and $E(x,y)=e^{-yx}$ we obtain $$L_k = \sum_{i=1}^{r} \sum_{j=1}^{r} \exp(-y_{ij} S_k(v_i, v_j)) =$$

$$\sum_{i=1}^{r} \sum_{j=1}^{r} \exp(-y_{ij} S_{k-1}(v_i, v_j) - y_{ij} f_k((a_k \cdot v_i), (a_k \cdot v_j)))$$

We define $$w_{kij} := \exp(-y_{ij} S_{k-1}(v_i, v_j)) \quad (9a)$$

and get $$L_k = \sum_{i=1}^{r} \sum_{j=1}^{r} w_{kij} \exp(-y_{ij} f_k((a_k \cdot v_i), (a_k \cdot v_j)))$$

We plug in (6) (careful not to confuse summation indices):

$$L_k = \sum_{i=1}^{r} \sum_{j=1}^{r} w_{ij} \exp\left(-y_{ij}\left(\delta_k + \sum_{s=1}^{q} \sum_{t=1}^{q} \alpha_{kst} h_{ks}(a_k \cdot v_i) h_{kt}(a_k \cdot v_j)\right)\right) \quad (9b)$$

Now we reorder the summation in i,j such that summation over s,t becomes outermost and summation over i,j innermost. This is achieved by grouping together summands where the quantum functions 'h' responds '1' using of the properties of h shown in (7) and (8).

$$L_k = \sum_{s=1}^{q} \sum_{t=1}^{q} \sum_{\substack{i,j: \\ h_{ks}(a_k \cdot v_i)=1 \\ \wedge h_{kt}(a_k \cdot v_j)=1}} w_{ij} \exp(-y_{ij}(\delta_k + \alpha_{kst})) =$$

$$\sum_{s=1}^{q} \sum_{t=1}^{q} \sum_{\substack{i,j: \\ h_{ks}(a_k \cdot v_i)=1 \\ \wedge h_{kt}(a_k \cdot v_j)=1 \\ \wedge y_{ij}=1}} w_{ij} \exp(-\delta_k - \alpha_{kst}) +$$

$$\sum_{s=1}^{q} \sum_{t=1}^{q} \sum_{\substack{i,j: \\ h_{ks}(a_k \cdot v_i)=1 \\ \wedge h_{kt}(a_k \cdot v_j)=1 \\ \wedge y_{ij}=+1}} w_{ij} \exp(\delta_k + \alpha_{kst}) =$$

$$\sum_{s=1}^{q} \sum_{t=1}^{q} \exp(-\delta_k - \alpha_{kst}) \sum_{\substack{i,j: \\ h_{ks}(a_k \cdot v_i)=1 \\ \wedge h_{kt}(a_k \cdot v_j)=1 \\ \wedge y_{ij}=1}} w_{ij} +$$

$$\sum_{s=1}^{q} \sum_{t=1}^{q} \exp(\delta_k + \alpha_{kst}) \sum_{\substack{i,j: \\ h_{ks}(a_k \cdot v_i)=1 \\ \wedge h_{kt}(a_k \cdot v_j)=1 \\ \wedge y_{ij}=+1}} w_{ij}$$

The innermost summation terms depend on h (which we already determined), the projector a and the training data. For these we introduce:

$$W_{kst}^{+} := \sum_{\substack{i,j: \\ h_{ks}(a_k \cdot v_i)=1 \\ \wedge h_{kt}(a_k \cdot v_j)=1 \\ \wedge y_{ij}=1}} w_{ij} \quad (10)$$

and

-continued $$W_{kst}^- := \sum_{\substack{i,j: \\ h_{ks}(a_k \cdot v_i)=1 \\ \wedge h_{kt}(a_k \cdot v_j)=1 \\ \wedge y_{ij}=-1}} w_{ij} \quad (11)$$

and obtain $$L_k = \sum_{s=1}^{q}\sum_{t=1}^{q} W_{kst}^+ \exp(-\delta_k - \alpha_{kst}) + \sum_{s=1}^{q}\sum_{t=1}^{q} W_{kst}^- \exp(\delta_k + \alpha_{kst}) \quad (12)$$

The Utility of Using Quantum States

The usefulness of quantization for the weak learner becomes evident when comparing equation (9) with (12): The computational effort using equation (12) is relatively low such that even brute force or gradient search for optimal parameters $\delta$ and $\alpha$ is feasible.

Quantization additionally provides an effective method of data compression: We store not the actual values $a_k \cdot v$ into the template but the associated quantum state, which indicates which of the quantum functions responds '1'. Current modules use 16 quantum functions and correspondingly needs just 4 bits per value (or 2000 values per 1 KByte template).

Special Case: $\alpha_{st}$ Independent

If parameters $\alpha_{st}$ are all independent from each other a solution minimizing $L_k$ is very simple: Here we can set $\delta_k = 0$ and explicitly solve $$\frac{\partial L_k}{\partial \alpha_{kst}} = 0$$

which yields a closed form solution similar to that of the ada boost algorithm:

$$\alpha_{kst} = \frac{1}{2}\ln\left(\frac{W_{kst}^+}{W_{kst}^-}\right) \quad (12.1)$$

A solution resulting in greater generality applies certain restrictions that we will discuss next.

Eliminating $\delta$

We explicitly solve $\delta_k$ via $$\frac{\partial L_k}{\partial \delta_k} = 0:$$

$$\frac{\partial L_k}{\partial \delta_k} = -\sum_{s=1}^{q}\sum_{t=1}^{q} W_{st}^+ \exp(-\delta_k - \alpha_{kst}) + \sum_{s=1}^{q}\sum_{t=1}^{q} W_{st}^- \exp(\delta_k + \alpha_{kst}) =$$

$$-e^{-\delta_k}\sum_{s=1}^{q}\sum_{t=1}^{q} W_{st}^+ e^{-\alpha_{kst}} + e^{\delta_k}\sum_{s=1}^{q}\sum_{t=1}^{q} W_{st}^- e^{\alpha_{kst}} = 0 \Rightarrow$$

$$\delta_k = \frac{1}{2}\ln\left(\frac{\sum_{s=1}^{q}\sum_{t=1}^{q} W_{st}^+ e^{-\alpha_{kst}}}{\sum_{s=1}^{q}\sum_{t=1}^{q} W_{st}^- e^{\alpha_{kst}}}\right) \quad (13)$$

We eliminate $\delta_k$ by inserting (13) into (12):

$$L_k = \sum_{s=1}^{q}\sum_{t=1}^{q} W_{st}^+ \exp(-\delta_k - \alpha_{kst}) + \sum_{s=1}^{q}\sum_{t=1}^{q} W_{st}^- \exp(\delta_k + \alpha_{kst}) =$$

$$e^{-\delta_k}\sum_{s=1}^{q}\sum_{t=1}^{q} W_{st}^+ e^{-\alpha_{kst}} + e^{\delta_k}\sum_{s=1}^{q}\sum_{t=1}^{q} W_{st}^- e^{\alpha_{kst}} =$$

$$\left(\frac{\sum_{s=1}^{q}\sum_{t=1}^{q} W_{st}^- e^{\alpha_{kst}}}{\sum_{s=1}^{q}\sum_{t=1}^{q} W_{st}^+ e^{-\alpha_{kst}}}\right)^{\frac{1}{2}} \sum_{s=1}^{q}\sum_{t=1}^{q} W_{st}^+ e^{-\alpha_{kst}} + \left(\frac{\sum_{s=1}^{q}\sum_{t=1}^{q} W_{st}^+ e^{-\alpha_{kst}}}{\sum_{s=1}^{q}\sum_{t=1}^{q} W_{st}^- e^{\alpha_{kst}}}\right)^{\frac{1}{2}} \sum_{s=1}^{q}\sum_{t=1}^{q} W_{st}^- e^{\alpha_{kst}} =$$

$$\sum_{s=1}^{q}\sum_{t=1}^{q} W_{st}^- e^{\alpha_{kst}} = 2\left(\sum_{s=1}^{q}\sum_{t=1}^{q} W_{st}^- e^{\alpha_{kst}}\right)^{\frac{1}{2}} \left(\sum_{s=1}^{q}\sum_{t=1}^{q} W_{st}^+ e^{-\alpha_{kst}}\right)^{\frac{1}{2}}$$

This results in the generalized loss function of the weak learner $$L_k = 2\left(\sum_{s=1}^{q}\sum_{t=1}^{q} W_{st}^- e^{\alpha_{kst}}\right)^{\frac{1}{2}} \left(\sum_{s=1}^{q}\sum_{t=1}^{q} W_{st}^+ e^{-\alpha_{kst}}\right)^{\frac{1}{2}} \quad (14)$$

Vector Map+Dot Product (VMDP)

Various experiments with this new learning context showed that the restriction of the general metric to vector map+dot product provides superior learning results.

We comply with VMDP by further specifying $\alpha_{st}$ as follows:

$$\alpha_{st} = \beta_s \beta_t;\ \beta_i \in \mathfrak{R};\ i \in \{1, \ldots, q\}$$

Now $\beta_i$ are the variables to be fixed through minimizing L; we reduced our fitting-flexibility to q degrees of freedom; $\alpha_{st}$ are no longer independent.

Proof:

Starting with equation (6) ($f$ now indexed with 'l'):

$$f_l(x, y) = \delta_l + \sum_{i=1}^{q}\sum_{j=1}^{q} \alpha_{lij} h_{li}(x) h_{lj}(y) =$$

$$\delta_k + \sum_{i=1}^{q}\sum_{j=1}^{q} \beta_{li}\beta_{lj} h_{li}(x) h_{lj}(y) = \delta_l + \left(\sum_{i=1}^{q} \beta_{li} h_{li}(x)\right)\left(\sum_{i=1}^{q} \beta_{li} h_{li}(y)\right)$$

Plugging this into equation 3 gives:

$$S_k(u, v) = \sum_{l=1}^{k} \delta_l + \sum_{l=1}^{k} \left(\left(\sum_{i=1}^{q} \beta_{li} h_{li}(a_l \cdot u)\right)\left(\sum_{i=1}^{q} \beta_{li} h_{li}(a_l \cdot v)\right)\right) \quad (15a)$$

if we introduce vectors u', v' with $$u'_l := \sum_{i=1}^{q} \beta_{li} h_{li}(a_l \cdot u) \text{ and } v'_l = \sum_{i=1}^{q} \beta_{li} h_{li}(a_l \cdot v) \quad (15b)$$

we find that (15a) is just the dot product of u', v' plus an irrelevant constant additive shift $$\sum_{l=1}^{k} \delta_l.$$

In absence of a closed form solution for $\beta$ minimizing $L_k$ in equation (14) a gradient method was chosen. Here an additional constrained $$\sum_{i=1}^{q} \beta_{li} = 0$$

ensured convergence-stability.

Polynomial Approach

For determining $\beta$ and to investigate to what degree non-linearity plays a role in feature maps a polynomial approach was used:

$$\beta_i = \sum_{j=0}^{n} \gamma_j i^j$$

with independent parameters $\gamma_1, \ldots, \gamma_n$ and dependent $\gamma_0$ to ensure $$\sum_{i=1}^{q} \beta_{li} = 0.$$

Our results indicated that increasing polynomial order 'n' did not improve performance but eventually caused degradation (n>4). In one special solution the order 'n' was set to just 1 which also granted a very simple and fast comparison module.

Other Approaches

The learning scheme allows exchanging methods for $f$-parameter-determination and to apply arbitrary restrictions.

Transition to Log-Loss

As noted above the transition to log loss is straight forward once a solution for exp-loss is found. We apply an approximation for ada-boost classifiers with exp loss:

With (3), (4) and $E(x,y)=\ln(1+e^{-yx})$ we obtain:

$$L_k^{(\log)} = \sum_{i=1}^{r} \sum_{j=1}^{r} \ln(1 + \exp(-y_{ij} S_k(v_i, v_j))) =$$

$$\sum_{i=1}^{r} \sum_{j=1}^{r} \ln(1 + \exp(-y_{ij} S_{k-1}(v_i, v_j) - y_{ij} f_k((a_k \cdot v_i), (a_k \cdot v_j))))$$

With the approximation $$\ln(1 + e^{x+\alpha}) \approx \frac{1}{1 + e^{-x}} e^{\alpha}$$

and definition $$w'_{kij} := \frac{1}{1 + \exp(y_{ij} S_{k-1}(v_i, v_j))} \quad (16a)$$

we get $$L_k^{(\log)} \approx \sum_{i=1}^{r} \sum_{j=1}^{r} w'_{kij} \exp(-y_{ij} f_k((a_k \cdot v_i), (a_k \cdot v_j)))$$

we plug in (6) as we did above with exp loss:

$$L_k^{(\log)} \approx \quad (16b)$$

$$\sum_{i=1}^{r} \sum_{j=1}^{r} w'_{kij} \exp\left(-y_{ij}\left(\delta_k + \sum_{s=1}^{q} \sum_{t=1}^{q} \alpha_{kst} h_{ks}(a_k \cdot v_i) h_{kt}(a_k \cdot v_j)\right)\right)$$

Equation (16b) is formally identical with (9b) such that the remaining calculus is same as for exp-loss. The only relevant algorithmic part to switch between these loss functions is the computation of coefficients $w_{kij}$ in (9a) and (16a).

Projector Pool

The learning algorithm picks from a set of carefully chosen projectors. Raw vectors of different feature types are concatenated and the corresponding projector pools combined.

The following method is most efficient in case the parameters $\beta_i$ have a linear relation to the quantum index i:

Projectors Gabor-Magnitude and Gabor-Phase Vectors

For raw vectors containing Gabor magnitude or phase-differences we specify as projector-pool the rows of a projecting matrix P that reduces within-class variations.

We begin with the within-class scatter matrix (=covariance matrix of within-class deviations)

$$S := \sum_{i=1}^{r} (v_i - cg(i)) \otimes (v_i - cg(i)) \quad (17)$$

In this notation cg(i) indicates the center of gravity of the class to which index i belongs. We compute the significant eigenspace of S by arranging the n most significant normalized eigenvectors from S as row vectors to a matrix U.

Finally P is defined as P:=E−U$^T$U with E being the identity matrix.

A subspace dimension 'n' between 20 and 100 works well while the dimensionality of the raw vector is >=2000.

Projectors for Low Resolution Data

Low resolution raw vectors are simply normalized image patches containing a face. Of these we apply an LDA algorithm and use the resulting matrix as projector-pool.

Streamlining

Weighting the Training Data

Weights are used to equalize the population of classes (number of images per persons).

Real world training data is often very heterogeneous in class-population (zipfian distribution) which causes the training to pay unduly high attention to one or few persons. For compensation a weight $$w_i = \frac{1}{n_{c(i)}}$$

is assigned to each raw vector. $n_{c(i)}$ denotes the number of vectors belonging to the class if vector i. Using weights in this way provides improved generality of the trained metric.

Weights are also used to manually balance different training databases.

Weights represent a population quantity of the corresponding vector. They need to be crafted into the equation in such a way that a mere increase of training vectors (e.g. by duplication) would have the same effect. This would be at equation (9a) or (16a) as follows:

$$w_{kij} := w_i w_j \exp(-y_{ij} S_{k-1}(v_i, v_j)) \text{—for exp loss} \quad (18)$$

$$w'_{kij} := \frac{w_i w_j}{1 + \exp(y_{ij} S_{k-1}(v_i, v_j))} \text{ - for log loss} \quad (19)$$

Where principle components analysis (PCA) linear discriminant analysis (LDA) are used (projector pool computation), weights are considered in the computation of scatter matrix and average values.

Preselected Sets of Combinations

Equations (10) and (11) use all $r^2$ vector combinations. In practice this would be computationally expensive but we don't need all possible combinations for decent convergence and generalization. First due to symmetry and with leaving out identical pairs, we have just $$\frac{1}{2} r(r-1)$$

pairs to consider. The current training uses random subsets of these with $10^5 \ldots 10^6$ pairs. The selection is being refreshed every few training cycles.

The probability p(i, j) of selecting pair (i,j) is defined as follows:

$$p(i,j) \sim \sqrt{w_i w_j} \quad (20)$$

Consequently the cumulative weights in equations (18) and (19) need adaptation as weighting now partially happens in the pair-selection:

$$w_{kij} := \sqrt{w_i w_j} \exp(-y_{ij} S_{k-1}(v_i, v_j)) \text{—(for exp loss)} \quad (21)$$

$$w'_{kij} := \frac{\sqrt{w_i w_j}}{1 + \exp(y_{ij} S_{k-1}(v_i, v_j))} \text{ (for log loss)} \quad (22)$$

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of generating a template map and a similarity metric used to determine a degree of visual similarity of two digital objects, comprising:
    storing a set of raw object templates, each raw object template representing image features derived from an object within a digital image of a corpus;
    iteratively performing an incremental learning process comprising:
        at each iteration, adding a map component to a template map that transforms a raw object template to a reduced object template, the reduced object template being stored in less memory than the raw object template;
        at each iteration, adding a metric component to a similarity metric that accepts as input two reduced object templates produced by the template map from raw object templates and produces as output a similarity score representing visual similarity of the objects represented by the two reduced object templates;
        wherein the metric component is added to the similarity metric based at least in part on values of the template map, and the map component is added to the template map based at least in part on values of the similarity metric; and
    storing the template map and the similarity metric.

2. The method of claim 1, wherein the template map employs a linear map matrix that maps a raw object template to a modified object template having fewer elements than the raw object template.

3. The method of claim 2, wherein the similarity metric employs one or more matrices, and wherein the template map further employs a quantizer function that maps elements of the modified object template to integers representing index values indexing into the one or more matrices of the similarity metric, thereby producing the reduced object template.

4. The method of claim 1, wherein adding the map component to the template map and adding the metric component to the similarity metric comprise:
    specifying a pool of candidate components, the pool comprising candidate map components and candidate metric components;
    for pairs of the candidate map components and candidate metric components, computing loss values corresponding to amounts of identification error of each of the pairs when identifying objects corresponding to the set of raw object templates;
    identifying optimal pairs based at least in part on the computed loss values; and
    responsive to the identifying, incorporating the identified optimal pairs into the template map and the similarity metric.

5. The method of claim 4, further comprising terminating the learning process responsive to at least one of:
    a predetermined number of iterations being reached; and
    a loss value of the identified optimal pairs being at least as great as a loss value of identified optimal components from a previous iteration.

6. The method of claim 4, wherein the pool of candidate components is specified dynamically at each iteration.

7. The method of claim 4, wherein the pool of candidate components is the same at each iteration.

8. The method of claim 4, wherein the loss values are obtained from a loss function for which a closed-form solution exists.

9. The method of claim 1, wherein the raw object templates are vectors, each vector element describing visual characteristics of a different portion of the object.

10. The method of claim 9, wherein the visual characteristics comprise one or more of color information, texture information, and edge information.

11. The method of claim 1, wherein the reduced object templates are stored within one kilobyte of memory or less.

12. The method of claim 1, further comprising:
    receiving a first reduced template representing a first object, and a second reduced template representing a second object; and
    applying the learned template map and the learned similarity metric to compute a similarity score representing visual similarity of the first reduced template and the second reduced template.

13. An object identification system for learning how to identify objects in a corpus of digital images, comprising:
    a data repository comprising a set of raw object templates, each raw object template representing image features derived from an object within a digital image of the corpus; and
    a learning module configured to:
        iteratively perform an incremental learning process comprising:
            at each iteration, adding a map component to a template map that transforms a raw object template to a reduced object template, the reduced object template being stored in less memory than the raw object template;
            at each iteration, adding a metric component to a similarity metric that accepts as input two reduced object templates produced by the template map from raw object templates and produces as output a similarity score representing visual similarity of the objects represented by the two reduced object templates;
            wherein the metric component is added to the similarity metric based at least in part on values of the template map, and the map component is added to the template map based at least in part on values of the similarity metric; and
        store the template map and the similarity metric in the data repository.

14. The system of claim 13, wherein the template map employs a linear map matrix that maps a raw object template to a modified object template having fewer elements than the raw object template.

15. The system of claim 14, wherein the similarity metric employs one or more matrices, and wherein the template map further employs a quantizer function that maps elements of the modified object template to integers representing index values indexing into the one or more matrices of the similarity metric, thereby producing the reduced object template.

16. The system of claim 13, wherein adding the map component to the template map and adding the metric component to the similarity metric comprise:

specifying a pool of candidate components, the pool comprising candidate map components and candidate metric components;

for pairs of the candidate map components and candidate metric components, computing loss values corresponding to amounts of identification error of each of the pairs when identifying objects corresponding to the set of raw object templates;

identifying optimal pairs based at least in part on the computed loss values; and responsive to the identifying, incorporating the identified optimal pairs into the template map and the similarity metric.

17. A non-transitory computer readable storage medium storing a computer program executable by a processor for learning how to identify objects in a corpus of digital images, the action of the computer program comprising:

storing a set of raw object templates, each raw object template representing image features derived from an object within a digital image of the corpus;

iteratively performing an incremental learning process comprising:

at each iteration, adding a map component to a template map that transforms a raw object template to a reduced object template, the reduced object template being stored in less memory than the raw object template;

at each iteration, adding a metric component to a similarity metric that accepts as input two reduced object templates produced by the template map from raw object templates and produces as output a similarity score representing visual similarity of the objects represented by the two reduced object templates;

wherein the metric component is added to the similarity metric based at least in part on values of the template map, and the map component is added to the template map based at least in part on values of the similarity metric; and storing the template map and the similarity metric.

18. The computer readable storage medium of claim 17, wherein adding the map component to the template map and adding the metric component to the similarity metric comprise:

specifying a pool of candidate components, the pool comprising candidate map components and candidate metric components;

for pairs of the candidate map components and candidate metric components, computing loss values corresponding to amounts of identification error of each of the pairs when identifying objects corresponding to the set of raw object templates;

identifying optimal pairs based at least in part on the computed loss values; and responsive to the identifying, incorporating the identified optimal pairs into the template map and the similarity metric.

19. The computer readable storage medium of claim 17, wherein the reduced object templates are stored within one kilobyte of memory or less.

20. A computer-implemented method of generating a template map and a similarity metric for determining a measure of visual similarity of two images, the method comprising:

initializing a template map for producing, from a plurality of real value features derived from the image, a reduced plurality of features that includes a plurality of integer value features representing the image;

initializing a similarity metric that compares the reduced plurality of features of a first image to the reduced plurality of features of a second image;

updating the template map and the similarity metric by iteratively performing the steps of:

selecting a map component from a group of candidate map components;

selecting a metric component from a group of candidate metric components;

comparing a first image and a second image using the template map, the selected map component, the similarity metric, and the selected metric component;

generating a measure of recognition accuracy for the comparison;

responsive to the measure of recognition accuracy having at least a threshold value, selectively adding the map component to the template map and selectively adding the selected metric component to the similarity metric; and storing the generated template map and the generated similarity metric.

21. A computer-implemented method of learning to compute degrees of similarity between human faces in digital images, comprising:

storing a plurality of training images containing a human face;

from each training image, associating with the training image a raw face template representing the face in the training image, thereby producing training face templates, the raw face template being a vector having n elements, for some integer n;

initializing the following to empty:

a linear map matrix adapted to store row vectors having n elements, a quantizer function adapted to map a scalar value to an index integer of one of a set of ranges, and a similarity matrix set adapted to store a plurality of matrices each having q rows and q columns, for some integer q;

iteratively performing the following operations:

specifying a plurality of candidate vectors having n elements, and a plurality of candidate matrices having q rows and q columns;

for a candidate vector of the selected plurality of candidate vectors and a candidate matrix of the selected plurality of candidate matrices:

computing a loss value quantifying face identification inaccuracy based at least in part on the candidate vector, the candidate matrix, the training face templates, the linear map matrix, the quantizer function, and the similarity matrix set;

determining that the candidate vector and the candidate matrix produce a lowest loss value with respect to others of the candidate vectors and candidate matrices;

appending the candidate vector to the linear map matrix;

appending the candidate matrix to the similarity matrix set;

terminating the iterative performing of the operations responsive to one or more of:

having performed a number of iterations exceeding a threshold number of iterations, and the computed loss value not being a threshold amount lower than a loss value from a directly preceding iteration; and storing the linear map matrix, the quantizer function, and the similarity matrix set.

* * * * *